(12) United States Patent
Lee et al.

(10) Patent No.: US 11,271,719 B2
(45) Date of Patent: Mar. 8, 2022

(54) CCTV VIDEO DATA DISTRIBUTION PROCESSING DEVICE AND METHOD THEREOF

(71) Applicant: Jeju National University Industry-Academic Cooperation Foundation, Jeju-si (KR)

(72) Inventors: Donghyeok Lee, Jeju-si (KR); Namje Park, Jeju-si (KR)

(73) Assignee: JEJU NATIONAL UNIVERSITY INDUSTRY-ACADEMIC COOPERATION FOUNDATION, Jeju-si (KR)

( * ) Notice: Subject to any disclaimer, the term of this patent is extended or adjusted under 35 U.S.C. 154(b) by 188 days.

(21) Appl. No.: 16/690,256

(22) Filed: Nov. 21, 2019

(65) Prior Publication Data

US 2020/0213086 A1 Jul. 2, 2020

(30) Foreign Application Priority Data

Nov. 26, 2018 (KR) .......................... 10-2018-0147009

(51) Int. Cl.
| | |
|---|---|
| *H04L 9/00* | (2006.01) |
| *H04L 9/06* | (2006.01) |
| *H04L 9/08* | (2006.01) |
| *H04L 9/32* | (2006.01) |

(52) U.S. Cl.
CPC .......... *H04L 9/0637* (2013.01); *H04L 9/0825* (2013.01); *H04L 9/3239* (2013.01); *H04L 2209/38* (2013.01)

(58) Field of Classification Search
CPC ... H04L 9/0637; H04L 9/0825; H04L 9/3239; H04L 2209/38; H04L 9/0662; H04L 9/002; H04N 21/23103; H04N 21/2347; H04N 21/23605; H04N 5/77; H04N 7/18
See application file for complete search history.

(56) References Cited

U.S. PATENT DOCUMENTS

| | | | | |
|---|---|---|---|---|
| 5,677,952 A | * | 10/1997 | Blakley, III | ............ G06F 21/31 380/28 |
| 9,679,160 B1 | * | 6/2017 | Zhang | .................... G06F 21/602 |
| 2004/0130623 A1 | * | 7/2004 | Han | .......................... H04N 7/18 348/150 |
| 2011/0107112 A1 | * | 5/2011 | Resch | ................. G06F 11/1004 713/193 |
| 2016/0065540 A1 | * | 3/2016 | Androulaki | ........... G06F 3/0641 713/171 |

(Continued)

*Primary Examiner* — Yogesh Paliwal
*Assistant Examiner* — Hassan Saadoun
(74) *Attorney, Agent, or Firm* — Lex IP Meister, PLLC

(57) ABSTRACT closed circuit television (CCTV) image data distribution processing apparatus includes a CCTV image data receiver configured to receive CCTV image data from a CCTV camera, an encryption processor configured to perform encryption-processing on the CCTV image data, a data splitter configured to split the CCTV image data into chunk data, an index processor configured to perform index-processing on the chunk data with an index generated through the encryption, and a controller configured to distribute and store the index-processed chunk data in a plurality of storage servers corresponding to corresponding indexes, respectively, or to decode chunk data to restore original CCTV image data when receiving the chunk data stored in the storage server.

14 Claims, 3 Drawing Sheets

(56) References Cited

U.S. PATENT DOCUMENTS

| | | | | |
|---|---|---|---|---|
| 2016/0182486 | A1* | 6/2016 | Wu | G06F 21/6209 |
| | | | | 726/28 |
| 2017/0026573 | A1* | 1/2017 | Lee | H04N 5/247 |
| 2018/0295327 | A1* | 10/2018 | Yearwood | B25J 11/002 |
| 2019/0356934 | A1* | 11/2019 | MacDonald | H04N 21/42204 |

* cited by examiner

CCTV VIDEO DATA DISTRIBUTION PROCESSING DEVICE AND METHOD THEREOF

CROSS-REFERENCE TO THE RELATED APPLICATION

This application claims priority from Korean Patent Application No. 10-2018-0147009, filed on Nov. 26, 2018, in the Korean Intellectual Property Office, the disclosure of which is incorporated herein by reference in its entirety.

BACKGROUND OF THE INVENTION

Field of the Invention

The present disclosure relates to a closed circuit television (CCTV) image data distribution processing apparatus and a method thereof.

Description of the Related Art

Recently, along with the development of cloud computing, interest in outsourcing of a spatial database has suddenly increased. Thus, research has been actively conducted into a spatial coordinate transformation scheme for protecting position (location) data in database outsourcing. However, since conventional spatial coordinate transformation schemes are vulnerable to proximity (general) attacks, when original data is outsourced without change, there is a risk that personal information such as medical/disease information or financial information of a data owner may is exposed by a service provider.

Closed circuit television (CCTV) image data has characteristics of high volume data, which has a limit in terms of data retention, and thus, as described above, outsourcing of distributing and storing data in a plurality of servers rather than storing data in a single server has been used.

CCTV image data includes information on a personal moving path, and thus, there is a problem in that privacy based on private movement is exposed when the CCTV image is analyzed.

In general, outsourcing that distributes and stores such image data mainly uses an order preserving encryption (OPES) technology, but the technology is fatally disadvantageous in that it is possible to track back to the data by analyzing the data and has a problem in that it is possible to estimate distribution processing of image data by analyzing a frequency and a number of times of queries of distribution of the image data.

CITED REFERENCE

Patent Document (Patent Document 0001) Korean Patent No. 10-1760095 (CCTV security monitoring apparatus and method using hardware security module based on encryption key)

SUMMARY OF THE INVENTION

Therefore, the present disclosure has been made in view of the above problems, and it is an object of the present disclosure to provide an apparatus and method of preventing an attacker who does not know an index key from knowing a server for storing image information of a specific person by splitting and encrypting CCTV image information into a plurality of chunks and storing the encrypted chunks in different storage servers using a secure index technology when closed circuit television (CCTV) image information is stored.

In accordance with an aspect of the present disclosure, the above and other objects can be accomplished by the provision of a closed circuit television (CCTV) image data distribution processing apparatus including a CCTV image data receiver configured to receive CCTV image data from a CCTV camera, an encryption processor configured to preform encryption-processing on the CCTV image data, a data splitter configured to split the CCTV image data into chunk data, an index processor configured to perform index-processing on the chunk data with an index generated through the encryption, and a controller configured to distribute and store the index-processed chunk data in a plurality of storage servers corresponding to corresponding indexes, respectively, or to decode chunk data to restore original CCTV image data when receiving the chunk data stored in the storage server.

The encryption processor may generate the index through cipher block chaining (CBC) encryption using an initial pseudorandom number shared with the storage server.

The data splitter may split the CCTV image data into chunk data with a specific size.

The index processor may perform index-processing appropriate for a corresponding storage server in consideration of a correlation with a storage server that is supposed to store the chunk data.

The initial pseudorandom number may be differently set depending on the CCTV camera.

In accordance with an aspect of the present disclosure, the above and other objects can be accomplished by the provision of a closed circuit television (CCTV) image data distribution processing method including receiving CCTV image data from a CCTV camera, performing encryption-processing on the CCTV image data using an initial pseudorandom number shared with a storage server, splitting the CCTV image data into chunk data, performing index-processing on the chunk data with an index generated through the encryption, and distributing and storing the index-processed chunk data in a plurality of storage servers corresponding to corresponding indexes, respectively.

The method may further include decoding chunk data to restore original CCTV image data when receiving the chunk data stored in the storage server.

The performing encryption-processing may include generating the index through cipher block chaining (CBC) encryption.

The splitting the CCTV image data may include splitting the CCTV image data into chunk data with a specific size.

The performing index-processing may include performing index-processing appropriate for a corresponding storage server in consideration of a correlation with a storage server that is supposed to store the chunk data.

The initial pseudorandom number may be differently set depending on the CCTV camera.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE INVENTION

The attached drawings for illustrating exemplary embodiments of the present disclosure are referred to in order to gain a sufficient understanding of the present disclosure, the merits thereof, and the objectives accomplished by the implementation of the present disclosure.

However, the present disclosure may be embodied in many different forms and should not be construed as being limited to the embodiments set forth herein These embodiments are provided so that this disclosure will be thorough and complete, and will fully convey the concept of the invention to one of ordinary skill in the art.

In addition, the invention may be defined only by the scope of the claim.

Accordingly, in some embodiments, well-known components, operations, and arts are not described in detail in order to avoid obscuring the concepts of the present disclosure.

In addition, the same reference numbers will be used throughout the drawings to refer to the same or like parts, and the terminology used in this specification are used to describe specified embodiments and are not intended to limit the scope of another embodiment.

In this specification, an expression used in the singular encompasses the expression of the plural, unless it has a clearly different meaning in the context, and the terms such as 'comprise (or comprising)' are intended to indicate the existence of one or other components and operations are not intended to preclude the possibility that one or more components and operations may exist or may be added.

All terms (including technical or scientific terms) have the same meanings as generally understood by a person having ordinary skill in the art to which the present disclosure pertains unless mentioned otherwise.

Unless differently defined in the present disclosure, such terms should not be interpreted in an ideal or excessively formal manner.

Hereinafter, the exemplary embodiments of the present disclosure will be described with reference to the accompanying drawings.

Figure 1:
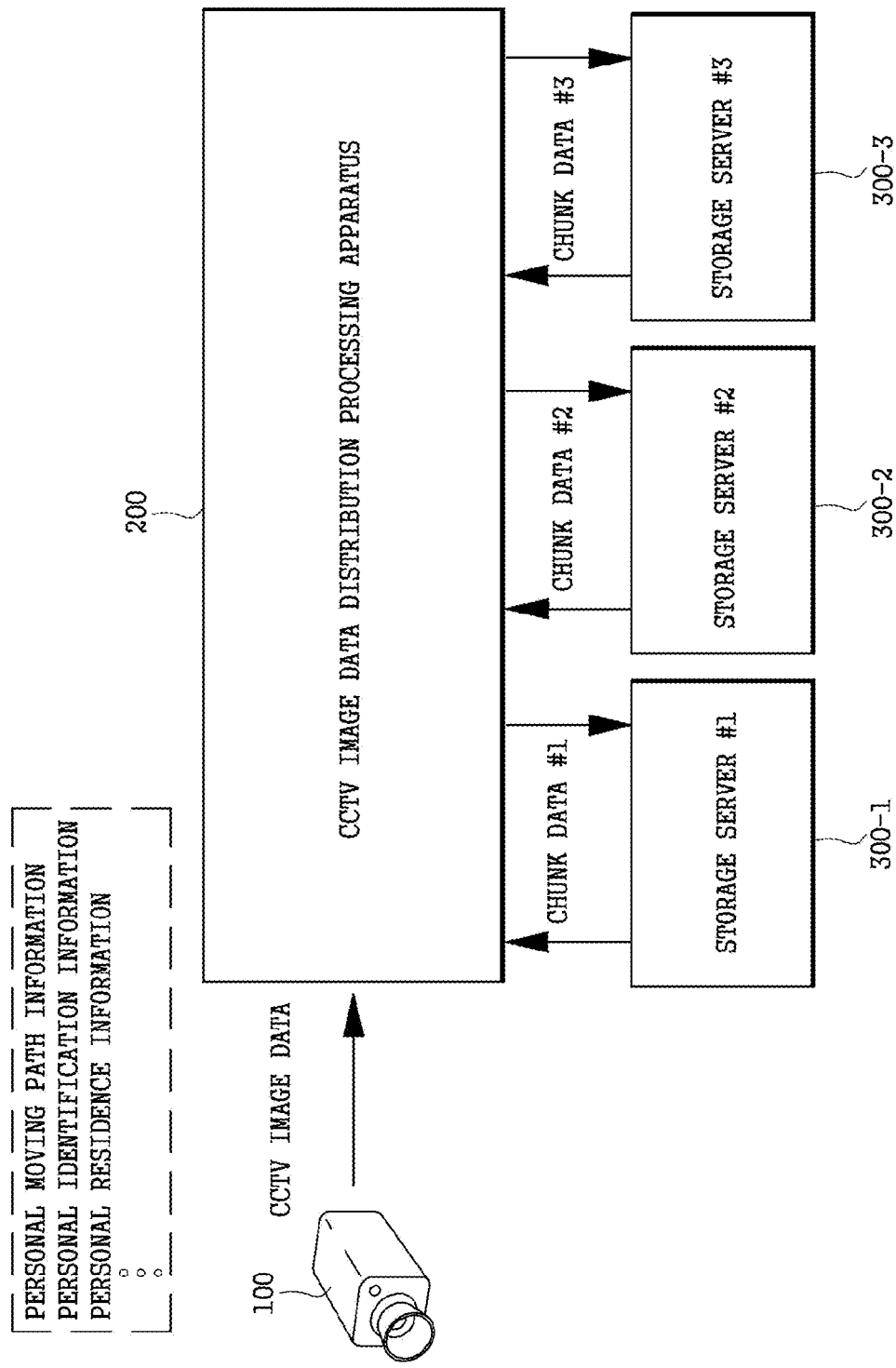
FIG. 1 is a diagram for explaining a configuration of a system including a closed circuit television (CCTV) image data distribution processing apparatus according to an embodiment of the present disclosure.

FIG. 1 is a diagram for explaining a configuration of a system including a closed circuit television (CCTV) image data distribution processing apparatus according to an embodiment of the present disclosure.

A CCTV camera 100 may generate image data of personal private information including personal moving path information, personal identification information, personal residence information, or the like of a specific person.

The personal private information generated by the CCTV camera 100 may be stored in a server and such personal private information may be defenselessly exposed when the server is hacked.

Thus, a CCTV image data distribution processing apparatus 200 according to the present disclosure may receive CCTV image data including the personal private information generated by the CCTV camera 100, may encrypt the CCTV image data through an encryption procedure, may then split the encrypted CCTV image data into a plurality of pieces of chunk data, may perform index-processing on the split chunk data to contain identification information of a storage server 300 that is supposed to store the corresponding chunk data in the chunk data, and may store the index-processed data in the corresponding storage server 300 to prevent the personal private information from being exposed.

Here, the chunk data may have a predetermined size and a chunk data group stored in the same storage server 300 may be indexed with the same storage server identification.

The plurality of pieces of chunk data may have index values according to corresponding sequences and may be index-processed through an encryption procedure using an initial pseudorandom number that is an encryption initial value that is pre-shared with the storage server 300.

In particular, according to the present disclosure, encryption-processing may be performed by performing index processing through cipher block chaining (CBC) encryption.

That is, the CCTV image data distribution processing apparatus 200 according to the present disclosure may split image data captured by the CCTV camera 100 into a plurality of pieces of encrypted image chunk data, may perform index-processing on the pieces of split chunk data according to identification of the storage server 300 and a splitting sequence using a secure indexing technology, and may store the pieces of data in different storage servers 300, respectively.

Here, the pieces of split chunk data may be distributed, kept, and stored in different storage servers 300, respectively, and index tables corresponding to identifications of storage servers and splitting sequences may be separately present.

Here, the index table may be function-processed in one direction and may be known by only a manager.

That is, which storage server stores chunk data among the storage servers 300 may be known by only an authorized manager that manages the index table.

In FIG. 1, an example in which the storage server is three storage servers 300-1, 300-2, and 300-3 will be described.

For example, chunk data stored in a storage server #1 300-1 among the pieces of split chunk data may include identifications corresponding to the same storage server #1 300-1 in index information, chunk data stored in a storage server #2 300-2 among the pieces of split chunk data may include identifications corresponding to the same storage server #2 300-2 in index information, and chunk data stored in a storage server #3 300-3 among the pieces of split chunk data may include identifications corresponding to the same storage server #3 300-3 in index information.

The split chunk data may have an encrypted index value through a CBC secure indexing technology and may be stored in the corresponding storage server 300, and thus, when an index key is not known, an attacker may not be capable of verifying which storage server stores specific chunk data among the storage servers 300.

Thus, even if a hacker hacks the storage servers 300-1, 300-2, and 300-3 and checks chunk data of the corresponding server, when the hacker does not know an initial pseudorandom number, he or she may not be capable of knowing where next chunk data after first chunk data is stored.

This is because, even if a position of first chunk data is checked and corresponding data is brought, when an initial pseudorandom number is not known, which storage server stores second and third chunk data is not known.

This is because, according to the present disclosure, an index value of chunk data is randomly generated through a secure indexing technology using a CBC encryption scheme based on an initial pseudorandom number and the chunk data is stored in a storage server among the storage servers 300, which is matched with the corresponding index value.

That is, an initial pseudorandom number needs to be known in order to generate the same pseudorandom number, and thus, when a hacker as an attacker does not know the initial pseudorandom number, the hacker is not capable of knowing a storage server among the storage servers 300, which stores image chunk data, and an order of storing the image chunk data, and thus, is not capable of collecting the entire chunk data.

In particular, according to the present disclosure, it may not be possible to restore the entire CCTV image data when partial chunk data is just collected by processing an encryption mode as a CBC mode. This is because the entire chunk data of corresponding CCTV image data needs to be collected in order to restore the entire CCTV image data.

For example, when specific CCTV image data is split into 7 pieces of chunk data, all #1 to #7 chunk data need to be collected in order to decode the image data (characteristics of CBC encryption-processing).

Here, the CCTV image data distribution processing apparatus 200 knows the initial pseudorandom number and the index table information, and thus, when chunk data is received from each of the storage servers 300-1, 300-2, and 300-3, the complete CCTV image data may be restored by decoding all the received chunk data.

Figure 2:
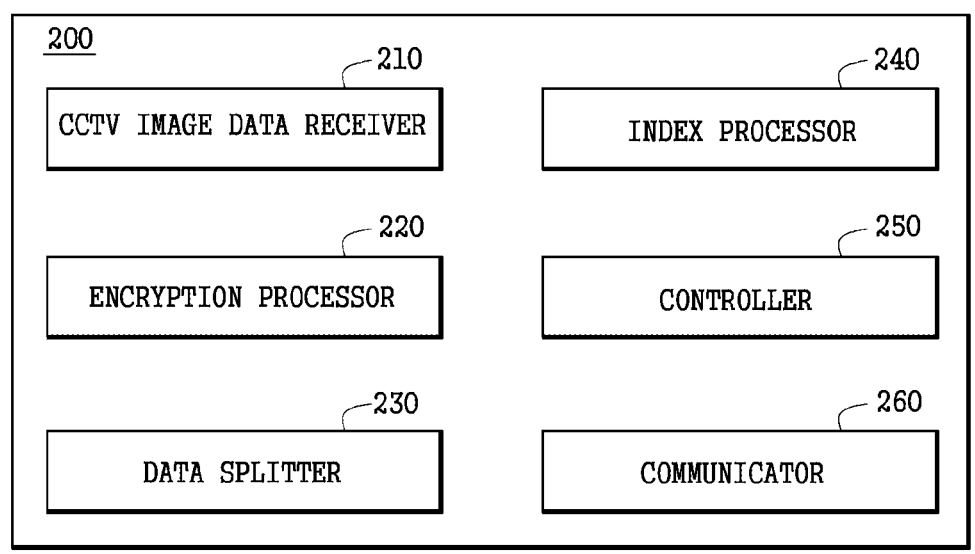
FIG. 2 is a diagram showing a configuration of a CCTV image data distribution processing apparatus according to an embodiment of the present disclosure.

FIG. 2 is a diagram showing a configuration of a CCTV image data distribution processing apparatus according to an embodiment of the present disclosure.

The CCTV image data distribution processing apparatus 200 according to the present disclosure may include a CCTV image data receiver 210, an encryption processor 220, a data splitter 230, an index processor 240, a controller 250, and a communicator 260.

The CCTV image data receiver 210 may receive CCTV image data from the CCTV camera 100.

The encryption processor 220 may perform encryption-processing on the received CCTV image data.

Here, the encryption processor 220 may generate index information through a cipher block chaining (CBC) encryption using an initial pseudorandom number shared with the storage server 300.

That is, index information appropriate for an identification of the storage server 300 and a splitting sequence of the chunk data may be generated, an index table may be generated, and matching information between the generated index information and corresponding split data may be stored in the index table.

The index information may be generated using Equation 1 below.

$$IDXn = \sum_{i=1}^{n} PRNGi \bmod q \qquad \text{[Equation 1]}$$

Here, IDXn is an $n^{th}$ index key value.
Here, PRNGi is an $i^{th}$ pseudorandom number.
Here, q is the number of all servers that are capable of storing data.

Thus, in order to obtain IDXn, an initial pseudorandom number required to obtain a pseudorandom number needs to be known in detail.

The initial pseudorandom number may be a value pre-shared between the CCTV image data distribution processing apparatus 200 and the reliable storage server 300, and an attacker that does not know such pre-shared information may not be capable of generating accurate value of IDXn.

Here, an identification of a storage server may be found based on the generated index information, and image chunk data may be stored in the corresponding storage server.

The data splitter 230 may split the encryption-processed CCTV image data into chunk data with a predetermined size.

The index processor 240 may perform index-processing on the split chunk data with the index generated through the encryption.

That is, index information appropriate for a storage server, which stores split chunk data, and a splitting sequence of the split chunk data may be input.

In particular, the index processor 240 may perform index-processing appropriate for the corresponding storage server 300 in consideration of a correlation with a storage server among the storage servers 300, which is supposed to store the chunk data. For example, index-processing may be performed to store a large amount of chunk data as possible in a specific storage server among the storage servers 300 depending on a distance relationship between the CCTV image data distribution processing apparatus 200 and the storage server 300 and importance of the storage server 300.

For example, a large amount of chunk data as possible may be stored in a storage server that is positioned relatively close to the CCTV image data distribution processing apparatus 200 or is resistant to security.

The controller 250 may distribute and store chunk data on which index-processing is performed in the plurality of storage servers 300 corresponding to corresponding indexes, respectively.

When receiving the chunk data stored in the storage server 300, the controller 250 may perform a function of decoding all the received chunk data and restoring original CCTV image data.

The controller 250 may identify the CCTV camera 100, may differently generate an initial pseudorandom number depending on the identification information of the CCTV camera 100, and may share the initial pseudorandom number with the storage server 300.

That is, index information may be differently generated depending on the identification information of the CCTV camera 100.

The communicator 260 may communicate with the storage server 300 to transmit and receive chunk data.

Figure 3:
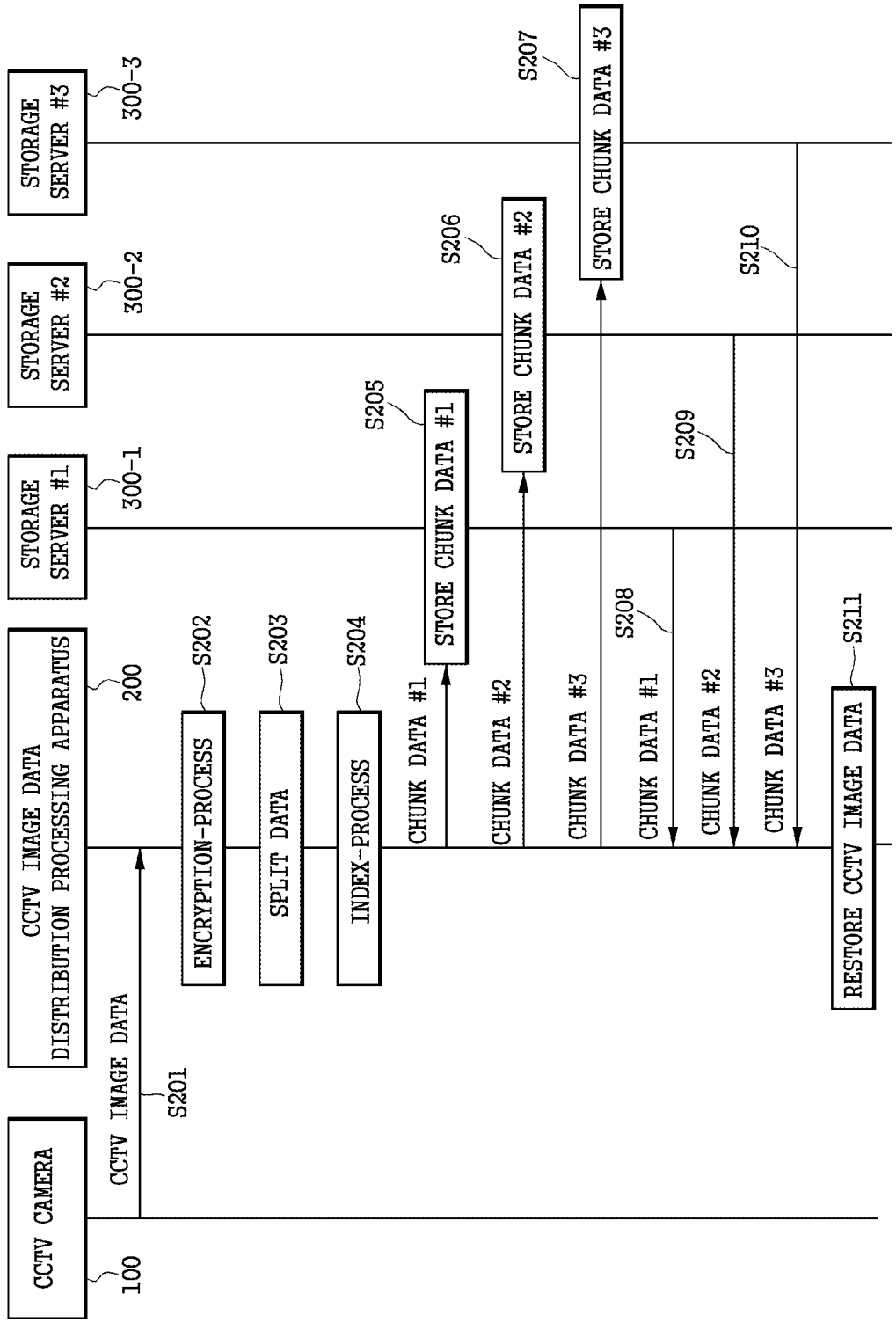
FIG. 3 is a diagram for explaining a method of distribution processing CCTV image data according to an embodiment of the present disclosure.

FIG. 3 is a diagram for explaining a method of distribution processing CCTV image data according to an embodiment of the present disclosure.

Operation S201 may be an operation of receiving CCTV image data from the CCTV camera 100 by the CCTV image data distribution processing apparatus 200.

Operation S202 may be an operation of performing encryption-processing on the CCTV image data using an initial pseudorandom number shared with the storage server 300 by the CCTV image data distribution processing apparatus 200.

As described above, the CCTV image data distribution processing apparatus 200 may generate index information through a CBC encryption method using an initial pseudorandom number shared with the storage server 300.

Here, an initial pseudorandom number may be differently generated depending on CCTV camera identification information.

Operation S203 may be an operation of splitting the CCTV image data into chunk data.

The chunk data may be split into data with a specific size and number depending on the number of the storage servers 300.

Operation S204 may be an operation of performing index-processing on the chunk data with an index generated through encryption.

The split chunk data needs to be stored in a specific storage server, and thus, index-processing of inputting index information appropriate for an identification of a corresponding server and a splitting sequence to corresponding split chunk data may be performed.

Operations S205, S206, and S207 may be operations of distributing and storing the index-processed chunk data in the plurality of storage servers 300-1, 300-2, and 300-3, which correspond to the corresponding indexes, respectively.

Operations S208, S209, and S210 may be operations of receiving the chunk data distributed and stored in the CCTV image data distribution processing apparatus 200 from the corresponding storage servers 300-1, 300-2, and 300-3, respectively.

Operation S211 may be an operation of receiving the chunk data stored in the plurality of storage servers 300-1, 300-2, and 300-3 and decoding the received chunk data to restore original CCTV image data by the CCTV image data distribution processing apparatus 200.

According to the present disclosure, when CCTV image data is stored, a problem in terms of invasion of privacy based on information on a private position may be overcome by distributing and storing data through an encryption method.

In addition, according to the present disclosure, even if some image information of a specific person is checked, when an initial pseudorandom number required for an index value is not known, it is not possible to check where a next split image is stored, and thus, the split image data may be safely stored and managed.

It will be apparent to those skilled in the art that various modifications and variations can be made in the present disclosure without departing from the spirit or scope of the invention. Thus, it is intended that the present disclosure cover the modifications and variations of this invention provided they come within the scope of the appended claims and their equivalents.

What is claimed is:

1. A closed circuit television (CCTV) image data distribution processing apparatus, the apparatus comprising:
   a CCTV image data receiver configured to receive CCTV image data from a CCTV camera;
   an encryption processor configured to perform encryption-processing on the CCTV image data;
   a data splitter configured to split the CCTV image data into a plurality of chunk data;
   an index processor configured to perform index-processing on the plurality of chunk data with an index generated through the encryption; and
   a controller configured to distribute and store the plurality of index-processed chunk data in a plurality of storage servers corresponding to corresponding indexes, respectively, or to decode chunk data to restore original CCTV image data when receiving the plurality of chunk data stored in the storage servers,
   wherein the encryption processor generates the indexes through cipher block chaining (CBC) encryption using an initial pseudorandom number shared with the storage servers.

2. The apparatus of claim 1, wherein the data splitter splits the CCTV image data into chunk data with a specific size.

3. The apparatus of claim 1, wherein the index processor performs index-processing appropriate for a corresponding storage server in consideration of a correlation with a storage server that is supposed to store the chunk data.

4. The apparatus of claim 1, wherein the initial pseudorandom number is differently set depending on the CCTV camera.

5. A closed circuit television (CCTV) image data distribution processing method, the method comprising:
   receiving CCTV image data from a CCTV camera;
   performing encryption-processing on the CCTV image data using an initial pseudorandom number shared with a storage server, wherein performing encryption-processing includes generating the indexes through cipher block chaining (CBC) encryption using the initial pseudorandom number;
   splitting the CCTV image data into a plurality of chunk data;
   performing index-processing on the plurality of chunk data with indexes generated through the encryption; and
   distributing and storing the plurality of index-processed chunk data in a plurality of storage servers corresponding to the indexes, respectively.

6. The method of claim 5, further comprising:
   decoding chunk data to restore original CCTV image data when receiving the plurality of chunk data stored in the storage servers.

7. The method of claim 5, wherein the performing encryption-processing includes generating the indexes through cipher block chaining (CBC) encryption.

8. The method of claim 5, wherein the splitting the CCTV image data includes splitting the CCTV image data into the chunk data with a specific size.

9. The method of claim 5, wherein the performing index-processing includes performing index-processing appropriate for a corresponding storage server in consideration of a correlation with a storage server that is supposed to store the chunk data.

10. The method of claim 5, wherein the initial pseudorandom number is differently set depending on the CCTV camera.

11. The apparatus of claim 1, wherein the index processor:
    generates the indexes of the plurality of chunk data based on identifications of the storage servers and splitting sequences of the chunk data; and
    generates an index table that stores matching information between the indexes and the plurality of chunk data.

12. The apparatus of claim 11, wherein the index processor processes the index table in one direction.

13. The method of claim 5, wherein performing the index-processing includes:
    generating the indexes of the plurality of chunk data based on identifications of the storage servers and splitting sequences of the chunk data; and
    generating an index table that stores matching information between the indexes and the plurality of chunk data.

14. The method of claim 13, wherein performing the index-processing further includes processing the index table in one direction.

* * * * *